UNITED STATES PATENT OFFICE.

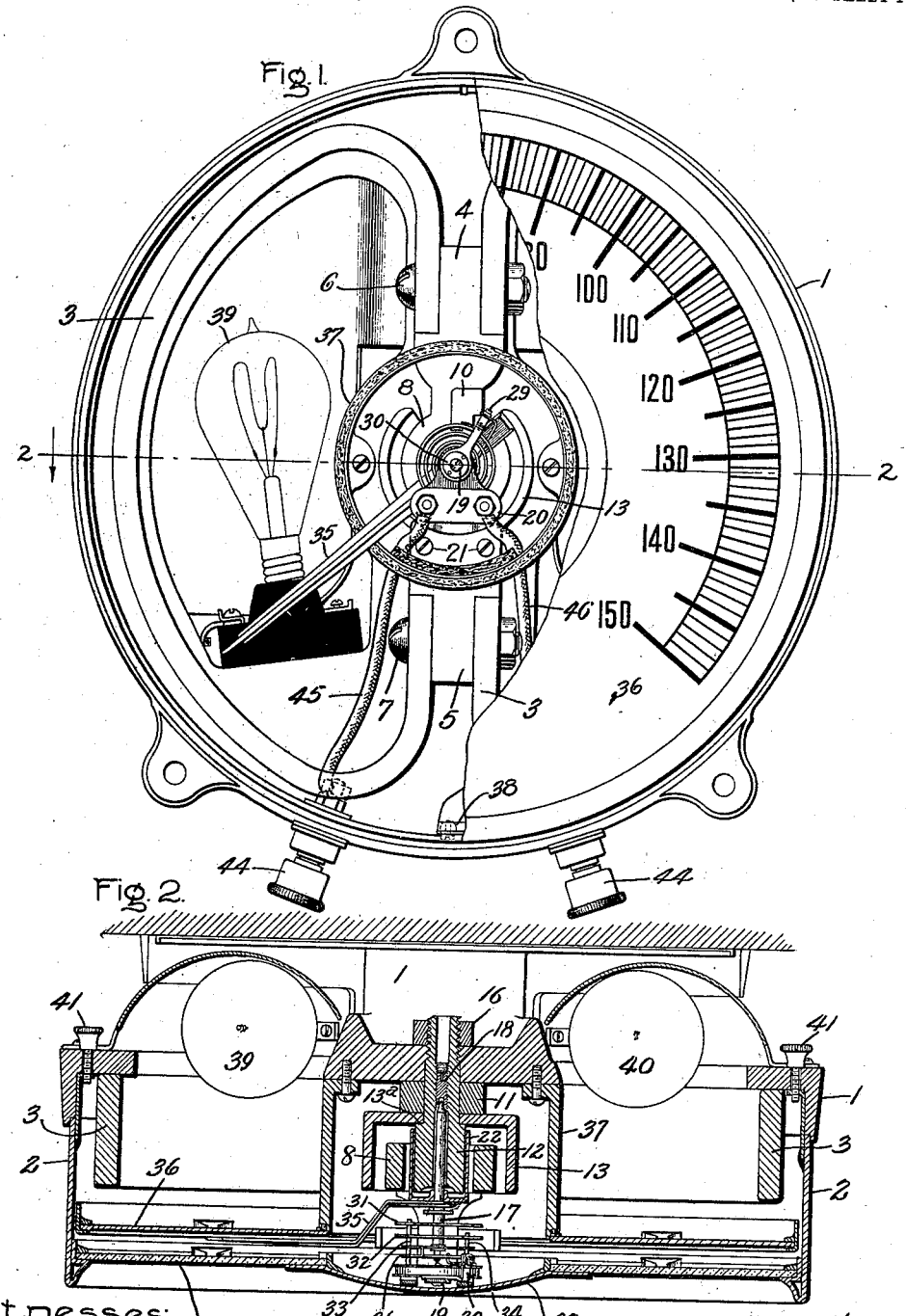

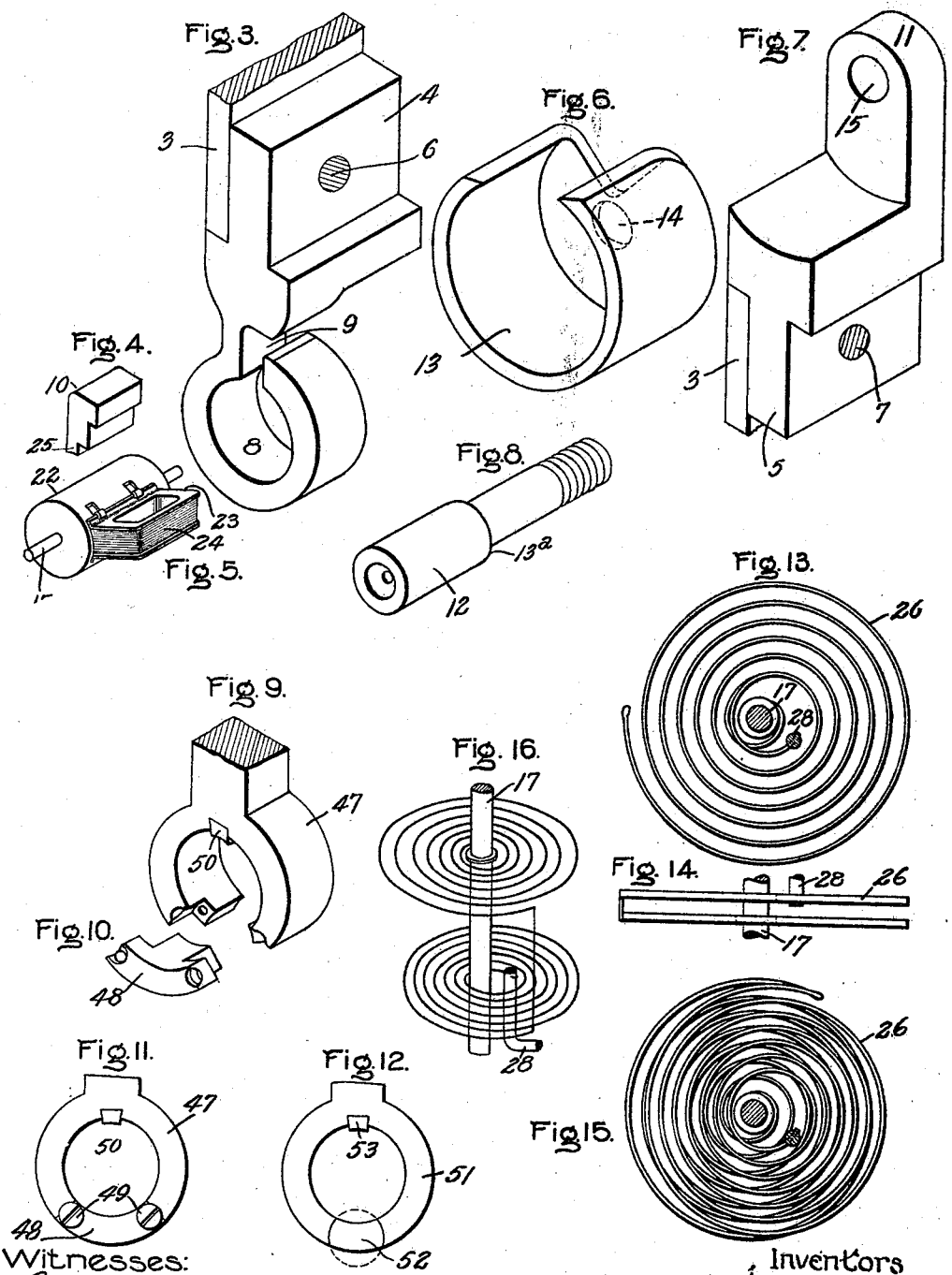

ELIHU THOMSON, OF SWAMPSCOTT, AND ROBERT SHAND, OF LYNN, MASSACHUSETTS, ASSIGNORS TO GENERAL ELECTRIC COMPANY, A CORPORATION OF NEW YORK.

ELECTRIC MEASURING INSTRUMENT.

996,377.

Specification of Letters Patent. Patented June 27, 1911.

Application filed December 12, 1906. Serial No. 347,495.

*To all whom it may concern:*

Be it known that we, ELIHU THOMSON and ROBERT SHAND, residing, respectively, at Swampscott and Lynn, county of Essex, State of Massachusetts, have invented certain new and useful Improvements in Electric Measuring Instruments, of which the following is a specification.

Our invention relates to electrical measuring instruments and particularly to instruments intended for indicating the instantaneous values of current or electromotive force in direct current circuits.

One object of our invention is to provide an instrument in which the moving element carrying the pointer has a large angular deflection and moves through equal angles for equal changes in the current passing through the instrument. In other words, our aim is to provide an instrument having a long and uniform scale.

Another object of our invention is to provide for damping the moving element so that it shall be practically dead beat.

A further object of our invention is to render the instrument incapable of being affected by changes in temperature or by magnetic fields produced by neighboring current-carrying conductors or otherwise.

For the purpose of accomplishing the above and other objects, our invention comprises a magnetic system in which there are two concentric annular fields and a current-carrying conductor supported for movement in these fields. A suitable damping device is attached to the moving element of which the current-carrying conductor is a part, and a specially designed spring furnishes the counter-torque. This spring for furnishing the counter-torque is not claimed in this case, but is made the subject of another application for Letters Patent, Serial No. 347,484 filed Dec. 12, 1906, in the name of Elihu Thomson, one of the joint inventors in the present case.

The details of construction and the mode of operation of our improved instrument are clearly set forth in the following specification and illustrated in the accompanying drawings, in which—

Figure 1 is an elevation of the instrument, part of the dial being broken away to show the interior construction; Fig. 2 is a sectional plan on line 2—2 of Fig. 1; Fig. 3 shows the ring pole piece; Fig. 4 shows the plug which fits the gap in the ring pole piece illustrated in Fig. 3; Fig. 5 is a view in perspective of the moving element; Figs. 6, 7 and 8 show in perspective the parts which go to make up one of the pole pieces; Figs. 9, 10, 11 and 12 show modifications of the ring pole piece; Fig. 13 is a plan view of the spring used in the instrument showing the shaft to which the spring is attached in cross section; Fig. 14 is an edge elevation of the spring; Fig. 15 is a view of the spring similar to that shown in Fig. 13, but with the spring displaced by a slight rotation of the shaft; and Fig. 16 is a diagrammatic view of the spring applied to the shaft.

As is seen from Fig. 1 the casing 1 of the instrument is circular in form with the scale over which the pointer moves extending around approximately 280° of its circumference. The casing consists of two parts: the base 1, preferably made of cast iron, and the cylindrical casing 2, preferably made of sheet metal. On the base 1 are supported the working parts of the instrument. The magnetic system may consist of two permanent magnets 3 of a shape somewhat resembling the letter C and arranged as shown in Fig. 1 with their ends adjacent one another. To the adjacent ends of these magnets 3 are fastened the pole pieces 4 and 5 by means of bolts 6 and 7, as shown in Fig. 1, or in any other suitable manner. Pole piece 4 (see Fig. 3) is extended to form a ring 8; this ring pole piece being cut through at 9 for the purpose hereinafter explained. A plug 10, shown in Fig. 4, is adapted to fit this gap 9 and make what is in effect a continuous ring. Pole piece 5, shown in Fig. 7, has extending therefrom an ear 11 which supports a center pole extension 12 (see Fig. 8) and a shell 13 (see Fig. 6). The shell 13 is fastened to the pole piece 5 by the center pole 12, the end of which is threaded and passes through the hole 14 in the shell 13 and the hole 15 in the ear 11, a nut 16 (see Fig. 2) serving to draw the shoulder 13ª on the center pole against the shell and thus hold the three parts together. It is desirable, in order to produce a uniform distribution of the magnetic field, that the magnetic connection of the shell 13 with the pole piece 5 be made through the ear 11, which extends from the pole piece 5 a distance greater than the outside radius of the shell 13 so that when the parts are assembled, the shell 13 is not large enough to extend from the hole 15 in the ear 11 to the pole piece 5, and a small air gap exists between the outer surface of the shell 13 and the body of the pole piece 5 when these parts have been bolted together by the center pole 12. With this construction the ring pole piece is sandwiched between the center pole 12 and the shell 13 of the other pole piece, thus producing two perfectly uniform concentric annular fields.

The moving element of the instrument is supported on the shaft 17 mounted in jeweled bearings. The inner bearing 18 is supported in the center pole 12, the jewel being held in a plug which is screwed into a threaded hole in the center pole as is shown in Fig. 2. The outer bearing 19 is supported in a bracket 20 mounted on the pole piece 5 in any suitable manner as by screws 21. On the shaft 17 is mounted a drum or thimble 22 made of copper, aluminum, or some other non-magnetic conductor. This thimble 22, which extends over the center pole 12, cuts the inner annular field and produces the necessary damping for the moving element. Fastened to the thimble 22 or in any other suitable manner supported to move with the shaft 17 is a bobbin 23 upon which is wound a coil of fine insulated wire 24 (see Fig. 5). The opening in the bobbin 23 is large enough to allow it to move over the ring pole piece 8 without coming in contact therewith. The gap 9 in the ring pole piece allows the bobbin to be slipped over the ring after which the plug 10 can be inserted in the gap and fastened there in any suitable manner as by being wedged therein. With this construction it is seen that the current carrying coil 24 is so arranged that the outer and inner sides thereof are each bathed in a strong and uniform annular field, and that, when a current is passed through this coil, the coil will tend to move in these fields, thereby producing rotation of the moving element of which the coil is a part. In order to increase the damping effect of the thimble 22, a projection 25 is formed on the inside of the plug 10, which has the effect of reducing the air gap at that point between the ring pole piece 8 and the center pole 12, thereby increasing the density of the magnetic flux at this point. As the bobbin 23 does not at any time pass through this part of the annular field, it is obvious that the air gap here may be made only large enough to allow the thimble 22 to move freely therein.

In a long range measuring instrument of the kind described the spring which furnishes the counter-torque against which the tendency of the coil to move is exerted, must contain many turns in order to give satisfactory resiliency. The ordinary form of volute spring, if made very long, is liable to sag and is open to the further objection of changing its length with variations in the temperature. Such a spring, if used in an instrument, is objectionable as tending to disturb the pointer from its zero position. We employ, therefore, a spring especially designed for use in a long range instrument or elsewhere where it is desired to return a rotary member to its initial position after rotation through a considerable angle. As previously stated this spring is made the subject of a separate application for Letters Patent, but it will, nevertheless, be here described. This spring 26 is illustrated in plan view in Fig. 13 and in edge elevation in Fig. 14. As is shown diagrammatically in Fig. 16, this spring consists of what may be considered two volute springs similarly wound and arranged in parallel planes and having their outer ends joined together. When the inner end of one of these volutes is fixed to the shaft to be controlled, and the inner end of the other volute is fastened to a fixed abutment, a spring control is obtained which fulfils the requirements which make a long spring necessary without at the same time being open to the objections which stand in the way of the use of long volutes. With this arrangement it is seen that as the shaft rotates one of the volutes has a tendency to coil up and the other to uncoil, a result which is illustrated in Fig. 15. Owing to the moderate length of the volutes there is no sagging, and as they are wound in the same direction with their outer ends free to move, any expansion or contraction due to changes in temperature will result simply in a movement of the outer ends of the volutes where they are joined together and will not affect the position of the shaft to which the spring is attached. To permit adjustability of the spring in order to bring the pointer of the instrument to its zero position, the abutment 28 to which the inner end of one of the volutes is fastened, is held by the arm 29 which is adjustable on an axis coinciding with the axis of the moving element. The arm 29 is held by the frictional contact of the nut 30 which may be loosened when it is necessary to adjust the arm.

The current is carried to and from the moving coil 24 through the coiled wires 31 and 32, the inner ends of which are connected with fine wires which extend along the shaft 17 from the coil 24, the outer ends of the coiled wires 31 and 32 being fastened to the posts 33 and 34 mounted on the bracket 20 which supports the outside bearing of the moving element.

The pointer 35 fixed to move with the shaft 17 extends outwardly so that its end passes over the dial 36 of the instrument. As a protection to the working parts of the instrument the circular box 37, preferably of non-magnetic material, as aluminum or brass, is fastened to the base of the instrument and surrounds the whole interior mechanism, holes being cut at opposite sides in this box for the insertion of the pole pieces. The dial upon which the scale of the instrument is printed is preferably made of some translucent material and supported from the base of the instrument by legs, one of which may be seen in plan view at 38. Incandescent lamps 39 and 40 may be located behind the dial for illuminating it. The casing 2, which may be fastened to the base of the instrument by thumb screws 41, or in any other suitable manner, carries a glass front 42 through which the scale may be seen. This glass front is preferably arranged to carry at its center a disk 43 preferably made of sheet metal which conceals the inner mechanism of the instrument. The base of the instrument carries the binding posts 44 which are connected by the conductors 45 and 46 to the terminals 33 and 34 of the moving coil. In case the instrument is to be used as a voltmeter an internal resistance is interposed in conductors 45 or 46. If the instrument is to be used as an ammeter the terminals of the instrument are connected across a shunt of low resistance in the manner well understood.

The instrument which we have shown and described is but one of the many forms in which our invention may be embodied. Its details of construction and proportion of parts may be varied without departing from the principles upon which our instrument is based. For example, Figs. 9, 10 and 11 and Fig. 12 show modifications of the ring pole piece. In the form shown in Figs. 9 to 11, the opening in the ring for the purpose of admitting the moving coil is made at the point opposite the isthmus of iron which connects the ring with the body of the pole piece. With this form of ring pole piece 47 a removable piece of iron 48 is fitted to the gap in the pole piece and may be fastened therein by means of screws 49, or in any other suitable manner. In order to increase the damping effect a small projecting piece of iron 50 is inserted on the inside of the ring and acts in exactly the same manner as the projection 25 on the plug 10 used with the form of pole piece shown in Fig. 3. Fig. 12 shows a ring pole piece 51 in which the gap for the admission of the moving coil 24 is made by drilling out a portion of the ring. The gap may be filled in by a plug 52 which may be held in place in any suitable manner as by screws, wedging, or otherwise. A projecting piece 53 is secured on the inside of the ring in the same manner as in the form of pole piece shown in Fig. 9. Other modifications in the construction of an instrument of this type will occur to those skilled in the art. It is our intention to include all such in the following claims.

What we claim as new, and desire to secure by Letters Patent of the United States, is,—

1. In an electrical measuring instrument, a magnet, pole pieces on said magnet arranged to produce two concentric annular fields, a moving element comprising a damping cylinder mounted to rotate in one of the annular fields, a current-carrying coil mounted on said cylinder to cut the flux in both of the annular fields, and means for furnishing the counter-torque for the moving element.

2. In an electrical measuring instrument, a magnet, a pole piece in the form of a ring attached thereto, a second pole piece having two concentric cylinders arranged one within the other, said ring pole piece being located between them, a moving element comprising a damping cylinder supported for rotation between the inner pole piece and the ring on an axis concentric with these parts, a current-carrying coil encircling said ring and carried by said damping cylinder, and means for furnishing the counter-torque for the moving element.

3. In an electrical measuring instrument, a magnet, a pole piece therefor in the form of a ring having a removable portion, a second pole piece having two concentric cylinders arranged one within the other, said ring pole piece being located between them, a moving element comprising a damping cylinder supported for rotation between the inner pole piece and the ring on an axis concentric with these parts, a current-carrying coil encircling said ring and carried by said damping cylinder, and means for furnishing the counter-torque for the moving element.

4. In an electrical measuring instrument, a magnet, a pole piece therefor in the form of a ring, a second pole piece having two concentric cylinders arranged one within said ring and the other surrounding it, a moving element comprising a damping cylinder supported for rotation between the inner pole piece and the ring, a small projecting block of iron fastened on the inside of said ring to lessen the air gap at that point, a current-carrying coil encircling said ring and carried by said damping cylinder, and means for furnishing the counter-torque for the moving element.

5. An electrical measuring instrument comprising means for producing a magnetic field of force, a measuring coil mounted to turn therein, and a damping conductor movable therewith, the air gap being smaller at a point outside the angle of movement of the coil to increase the damping effect.

In witness whereof, we have hereunto set our hands this eighth day of December, 1906.

ELIHU THOMSON.
ROBERT SHAND.

Witnesses:
JOHN A. McMANUS, Jr.,
HENRY O. WESTENDARP.